(12) United States Patent
Omori et al.

(10) Patent No.: US 8,033,710 B2
(45) Date of Patent: Oct. 11, 2011

(54) LIGHT GUIDE PLATE FOR SURFACE LIGHT SOURCE

(75) Inventors: Atsushi Omori, Tokyo (JP); Michiyo Tokita, Ichihara (JP)

(73) Assignee: Stanley Electric Co., Ltd., Tokyo (JP)

( * ) Notice: Subject to any disclaimer, the term of this patent is extended or adjusted under 35 U.S.C. 154(b) by 375 days.

(21) Appl. No.: 12/236,031

(22) Filed: Sep. 23, 2008

(65) Prior Publication Data

US 2009/0086509 A1    Apr. 2, 2009

(30) Foreign Application Priority Data

Sep. 27, 2007    (JP) ................................. 2007-250677

(51) Int. Cl.
*F21V 8/00*    (2006.01)
(52) U.S. Cl. ....... 362/628; 362/561; 362/97.2; 362/620; 362/626
(58) Field of Classification Search .................. 362/628, 362/606, 616, 617, 620, 626, 561, 511, 330; 385/901, 146; 359/707, 837; 349/65
See application file for complete search history.

(56) References Cited

U.S. PATENT DOCUMENTS

| 3,806,223 | A | * | 4/1974 | Keck et al. ................... 385/129 |
| 5,359,691 | A | * | 10/1994 | Tai et al. ....................... 385/146 |
| 5,931,555 | A | * | 8/1999 | Akahane et al. .............. 362/613 |
| 7,001,035 | B2 | * | 2/2006 | Kawakami .................... 362/617 |

FOREIGN PATENT DOCUMENTS

| JP | 2001-035224 |   | 2/2001 |
| JP | 2006-049286 |   | 2/2006 |
| WO | WO 03/010560 A2 | * | 2/2003 |

* cited by examiner

*Primary Examiner* — Sharon Payne
(74) *Attorney, Agent, or Firm* — Rankin, Hill & Clark LLP (57) ABSTRACT

A plurality of mirror surfaces (5), which extend in a direction (X-axis direction) perpendicular to a light incident surface (2a), are formed side by side in a longitudinal direction (Y-axis direction) of the light incident surface (2a) on a light distribution control surface (4a) of both surfaces (4a, 4b) of a light guide plate (1) in a thickness direction (Z-axis direction) thereof, and a plurality of prisms (7) extending in the Y-axis direction are formed side by side in the X-axis direction in areas other than the mirror surfaces (5). The mirror surfaces 5 are formed in such a way that Y-axis direction widths thereof vary in the X-axis direction. This enables the setting of the light distribution characteristics and luminance distribution of emitted light, which are viewed in two directions, namely a longitudinal direction of the light incident surface of the light guide plate and the direction perpendicular to the light incident surface, to target light distribution characteristics and luminance distribution.

16 Claims, 7 Drawing Sheets

LIGHT GUIDE PLATE FOR SURFACE LIGHT SOURCE

BACKGROUND OF THE INVENTION

1. Field of the Invention

The present invention relates to a light guide plate for a surface light source, which is used as a backlight or the like of a liquid crystal display.

2. Description of the Related Art

As a light guide plate for a surface light source used as a backlight of a liquid crystal display, for example, there is already known one disclosed in Japanese Patent Application Laid-Open No. 2001-35224 (hereinafter, referred to as "Patent Document 1") or Japanese Patent Application Laid-Open No. 2006-49286 (hereinafter, referred to as "Patent Document 2"). The light guide plate in Patent Document 1 has an incident surface of light source light, which is one side surface of the light guide plate, and one of both surfaces (the front surface and rear surface) in the thickness direction of the light guide plate is a reflective surface (a surface on which a reflective sheet is polymerized) for reflecting light guided into the light guide plate and the other is a light emitting surface. In this instance, dots which are a plurality of fine convex or concave portions are formed on the reflective surface or the emitting surface. The dots are used to scatter the light guided into the light guide plate to adjust the light traveling direction in order to emit the light guided into the light guide plate from the emitting surface. In this instance, the number of dots per unit area is increased as the distance from the light incident surface increases in order to uniform the luminance of the light emitted from the emitting surface of the light guide plate. In some cases, however, the area (the area viewed in the thickness direction of the light guide plate) of each dot may be increased along with an increase in the distance from the light incident surface.

In the light guide plate disclosed in Patent Document 2, a plurality of prisms (roulette) extending in a direction parallel to the light incident surface are formed on one of both surfaces of the light guide plate in the thickness direction thereof in parallel with the direction perpendicular to the light incident surface of the light guide plate. Moreover, the reflection or refraction of light on an inclined surface of the prism is used to adjust the traveling direction of the light guided into the light guide plate before the emission of the light from a light emitting surface of both surfaces in the thickness direction of the light guide plate. In this instance, the luminance of the light emitted from the light emitting surface is uniformed by decreasing the pitch of the prisms in the direction perpendicular to the light incident surface along with an increase in the distance from the light incident surface or by increasing the width of the inclined surface on the light incident surface side of the prism viewed in the thickness direction of the light guide plate along with an increase in the distance from the light incident surface.

In the dots in Patent Document 1 and the light guide plate with the prisms formed on the front or rear surface as disclosed in Patent Document 2, however, there has been the following problem.

Specifically, the light guide plate for a surface light source used as a backlight of a liquid crystal display is required to have appropriate light distribution characteristics similar to target light distribution characteristics as far as possible, with respect to the light distribution characteristics of the emitting direction or the degree of directivity of the light from the light emitting surface of the light guide plate.

In the light guide plate having dots on the front or rear surface as in Patent Document 1 (hereinafter, the front or rear surface of the light guide plate having the dots is sometimes referred to as "dot formation surface"), the light distribution characteristics of the emitted light vary according to the angle of inclination of a side wall surface of each dot in the above situation. Therefore, to achieve the target light distribution characteristics, it is necessary to set the angle of inclination of the side wall surface of each dot to a desired angle in advance. For example, to adjust the light distribution characteristics of the emitted light viewed in the longitudinal direction of the light incident surface to the target light distribution characteristics, it is necessary to set the angle of inclination of the side wall surface on the light incident surface side of each dot and the angle of inclination of the side wall surface on the side opposite to the light incident surface side to appropriate angles of inclination, respectively, in advance (the angle of inclination differs for each side wall surface in general).

Moreover, in the light guide plate having prisms on the front or rear surface as in Patent Document 2 (hereinafter, the front or rear surface of the light guide plate having the prisms is sometimes referred to as "prism formation surface"), the light distribution characteristics of the emitted light (the light distribution characteristics viewed in the longitudinal direction of the light incident surface) vary according to the angles of inclination of the inclined surfaces (an inclined surface on the light incident surface side and an inclined surface on the side opposite thereto) of each prism. Therefore, to achieve the target light distribution characteristics, it is necessary to set the angle of inclination of the inclined surface on the light incident surface side of each prism and the angle of inclination of the inclined surface on the side opposite to the foregoing inclined surface to appropriate angles of inclination (the angle of inclination differs for each inclined surface in general), respectively.

The light guide plate having the dot formation surface and the prism formation surface is generally formed by injection molding or the like by using a stamper (molding die) having a mold surface formed into a shape corresponding to the dot formation surface or the prism formation surface.

In this situation, it is very difficult to form a plurality of concave or convex portions corresponding to the dots on the formation surface by cutting or the like by using the stamper for use in forming the dot formation surface on the light guide plate. Therefore, the concave or convex portions are formed generally by exposure using photoresist and masking. Accordingly it is difficult to form a plurality of dots each having a desired shape on the dot formation surface of the light guide plate with accuracy. Particularly, it is extremely difficult to adjust the angle of inclination of the side wall surface of each dot to an appropriate angle of inclination for each portion of the side wall surface with accuracy.

Consequently, in the conventional light guide plate having the dot formation surface, the angle of inclination, but exclusive of the angle of inclination of a part of the side wall surfaces of each dot (for example, the side wall surface on the light incident surface side), often becomes an angle of inclination inappropriate for adjusting the light distribution characteristics of the light emitted from the light guide plate to the target light distribution characteristics. In addition, an edge of the side wall surface of a dot will be rounded in general, which easily causes light scattering in the portion. Moreover, an increase in dot density (the number of dots per unit area) on the dot formation surface of the light guide plate reduces the side wall surfaces in the portion where an overlap occurs between dots adjacent to each other. Therefore, it is impossible to largely increase the dot density and thus impossible to sufficiently increase the proportion of the dot side wall surfaces useful for controlling the light distribution of the emitted light on the dot formation surface of the light guide plate.

Given this situation, the conventional light guide plate with the dot formation surface easily emits a large amount of light in a direction largely deviating from the light emitting direction of the target light distribution characteristics (the light is sometimes referred to as "lost light"). Thereby, it has been difficult to emit the light guided into the light guide plate efficiently from the light guide plate with the target light distribution characteristics. Moreover, it is difficult to adjust the angle of inclination of the side wall surface of each dot to a desired angle of inclination for each portion of the side wall surface, which thus leads to a difficulty in adjusting both of the light distribution characteristics of the emitted light viewed in the longitudinal direction of the light incident surface and the light distribution characteristics of the emitted light viewed in the direction perpendicular to the light incident surface to the target light distribution characteristics.

On the other hand, in the light guide plate having the prism formation surface, it is possible to form a mold surface having a shape for a desired-shaped prism with relatively accuracy on the stamper for forming the prism formation surface by cutting or the like. Therefore, it is possible to adjust the angle of inclination of the inclined surface of each prism on the prism formation surface of the light guide plate to an appropriate angle of inclination with accuracy.

In the conventional light guide plate having the prism formation surface, however, the prisms merely extend in the longitudinal direction of the light incident surface. This causes a problem that it is impossible to adjust the light distribution characteristics of the emitted light viewed in the direction perpendicular to the light incident surface or the luminance distribution of the emitted light in the longitudinal direction of the light incident surface to the target light distribution characteristics or luminance distribution.

SUMMARY OF THE INVENTION

The present invention has been provided in view of the above background, and it is an object of the present invention to provide a light guide plate for a surface light source capable of setting the light distribution characteristics or luminance distribution of the emitted light viewed in two directions, the longitudinal direction of the light incident surface of the light guide plate and the direction perpendicular to the light incident surface of the light guide plate, to the target light distribution characteristics or luminance distribution. It is another object of the present invention to provide a light guide plate for a surface light source capable of emitting the light guided into the light guide plate efficiently with the target light distribution characteristics.

To achieve the above objects of the present invention, there is provided a light guide plate for a surface light source with at least one of a pair of side surfaces opposite to each other as a light incident surface, from which light source light is guided, wherein: at least one of both surfaces of the light guide plate in a thickness direction thereof is a light distribution control surface for adjusting light distribution characteristics of light emitted from the light guide plate, with formation of a plurality of flat surfaces, which extend in a direction perpendicular to the light incident surface and are arranged side by side in a longitudinal direction of the light incident surface and formation of a plurality of prisms, which extend in the longitudinal direction of the light incident surface in areas other than the flat surfaces of the light distribution control surface, which are arranged in the direction perpendicular to the light incident surface, and which each have a shape of triangle when viewed in the longitudinal direction of the light incident surface; and each of the plurality of flat surfaces is formed in such a way as to vary in width in the longitudinal direction of the light incident surface in the direction perpendicular to the light incident surface (First invention).

The "longitudinal direction of the light incident surface" is, in other words, a direction perpendicular to the light incident surface of the light guide plate and a direction orthogonal to the thickness direction of the light guide plate.

According to the first invention, the inclined surfaces of the plurality of prisms formed in the areas (areas each between the flat surfaces adjacent to each other in the longitudinal direction of the light incident surface and the like) other than the flat surfaces of the light distribution control surface have a function of adjusting the light distribution characteristics of the light emitted from the light guide plate, viewed in the longitudinal direction of the light incident surface (on the surface orthogonal to the longitudinal direction). In other words, it is possible to set the light distribution characteristics of the light emitted from the light guide plate (the light distribution characteristics viewed in the longitudinal direction of the light incident surface) to desired light distribution characteristics by the setting of the angles of inclination of the inclined surfaces of the prisms (an inclined surface on the light incident surface side and an inclined surface opposite thereto of each prism).

In this instance, it is possible to vary the percentage of a total area (hereinafter, sometimes referred to as "prism density") of the inclined surfaces of the prisms existing per unit area of the light distribution control surface, when the light distribution control surface is viewed in the thickness direction of the light guide plate, in a direction perpendicular to the light incident surface by varying the width of each flat surface in the direction perpendicular to the light incident surface. Therefore, it is possible to set a luminance distribution of the light emitted from the light guide plate in the direction perpendicular to the light incident surface (a luminance distribution of the light guide plate on a cross section orthogonal to the longitudinal direction of the light incident surface) by the setting of the manner of varying the width of each flat surface in the direction perpendicular to the light incident surface.

Moreover, side walls, which extend along opposite side edges of each flat surface and rise from the flat surface, are formed between the opposite side edges of the flat surface and the inclined surfaces of each prism adjacent to each other in the longitudinal direction of the light incident surface. Moreover, it is possible to let the side walls have a function of adjusting the light distribution characteristics of the light emitted from the light guide plate, viewed in the direction perpendicular to the light incident surface (on the surface orthogonal to the perpendicular direction). In other words, it is possible to set the light distribution characteristics of the light emitted from the light guide plate (the light distribution characteristics viewed in the direction perpendicular to the light incident surface) to the desired light distribution characteristics by the setting of the angles of inclination of the side walls.

Moreover, it is also possible to vary the width of each flat surface individually or according to a predetermined group each flat surface belongs to, on an arbitrary cross section parallel to the light incident surface of the light guide plate. This also enables the prism density to vary in the longitudinal direction of the light incident surface. Eventually, it enables the setting of the luminance distribution of the light emitted from the light guide plate in the longitudinal direction of the light incident surface (the luminance distribution of the light guide plate on the cross section parallel to the light incident surface).

Therefore, according to the first invention, it is possible to set the light distribution characteristics and luminance distribution of the emitted light, viewed in two directions, the longitudinal direction of the light incident surface of the light guide plate and the direction perpendicular to the light incident surface, to the target light distribution characteristics and luminance distribution.

In the first invention, the plurality of flat surfaces are formed so as to be reduced in width in a longitudinal direction of the light incident surface along with an increase in distance from the light incident surface (Second invention).

According to the second invention, it is possible to increase the prism density along with an increase in distance from the light incident surface. This enables uniformity of the luminance distribution of the light emitted from the light guide plate in a direction perpendicular to the light incident surface.

Moreover, in the case where both of the pair of side surfaces are light incident surfaces in the first invention, the plurality of flat surfaces are each formed so as to have such a width in the longitudinal direction of the light incident surfaces that is minimum in an intermediate position between the pair of side surfaces in the direction perpendicular to the light incident surfaces and that increases along with a decrease in distance from each of the pair of side surfaces in the direction perpendicular to the light incident surface (Third invention).

According to the third invention, the prism density increases along with an increase in distance from a light incident surface on one side (as being closer to the intermediate position from the light incident surface on one side) on the side of the pair of side surfaces (light incident surfaces) from the intermediate position between the pair of side surfaces which are the light incident surfaces. Similarly, on the other side of the pair of side surfaces (light incident surfaces), the prism density increases along with an increase in distance from a light incident surface on the other side (as being closer to the intermediate position from the light incident surface on the other side). Therefore, the prism density increases along with an increase in distance from the light incident surface on both sides of the pair of side surfaces (light incident surfaces) from the intermediate position. This enables the uniformity of the luminance distribution of the light emitted from the light guide plate in the direction perpendicular to the light incident surface, similarly to the second invention.

Furthermore, in the first to third inventions, preferably the plurality of prisms are formed in such a way that an inclined surface of a first prism on a second prism side intersects with an inclined surface of the second prism on the first prism side, where the first prism and the second prism are two arbitrary prisms adjacent to each other in a parallel direction thereof (Fourth invention).

According to the fourth invention, the inclined surfaces of the prisms are continuously arranged seamlessly in the direction perpendicular to the light incident surface in the areas other than the flat surfaces of the light distribution control surface. Therefore, it is possible to make the entire areas other than the flat surfaces of the light distribution control surface an effective surface for setting the light distribution characteristics of the light emitted from the light guide plate, viewed in the longitudinal direction of the light incident surface, to the target light distribution characteristics. The result is a reduction of lost light emitted from the light guide plate in a direction largely deviating from a light traveling direction of the target light distribution characteristics. Eventually it is possible to emit light, which has been guided into the light guide plate, efficiently from the light guide plate with the target light distribution characteristics.

In the first to fourth inventions, the plurality of flat surfaces may be classified into a plurality of groups and the lengths of the plurality of flat surfaces in the direction perpendicular to the light incident surface may be set to lengths depending on each of the groups (Fifth invention).

This enables the prism density to vary relatively largely in the direction perpendicular to the light incident surface, without largely varying the width of each flat surface on the light incident surface side in the direction perpendicular to the light incident surface. Therefore, even in the case where there is a need to vary the prism density relatively largely in the direction perpendicular to the light incident surface for uniformity of the light emitted from the light guide plate, it is possible to prevent an excessive increase in the maximum width of each flat surface. Furthermore, in the case where the surface light source using the light guide plate of the present invention as a backlight of a liquid crystal display, it is possible to prevent such a situation that an image having a shape of the flat surfaces is visually recognized.

Moreover, in the first to fifth inventions, a plurality of convex or concave dots may be formed in a scattered manner in areas closer to the light incident surface of the light distribution control surface (Sixth invention).

This causes the light guided from the light incident surface to the light guide plate to be scattered by the dots immediately after the light is guided. Therefore, it is possible to cause the light from a light source to be scattered in various places of the light guide plate immediately after the light from the light source is guided into the light guide plate, for example, in the case of using a point light source such as an LED as the light source of the light guided into the light guide plate. Consequently, this prevents a situation where a local dark space appears.

In the present invention and the description thereof, the terms "perpendicular," "orthogonal," and "parallel" need not have strict meanings of "perpendicular," "orthogonal," and "parallel." On the contrary, departures from the strict meanings of "perpendicular," "orthogonal," and "parallel" are allowed for the directions represented by these terms within the scope of the operation and effect of the present invention.

DETAILED DESCRIPTION OF THE PREFERRED EMBODIMENTS

First Embodiment

Figure 1A:
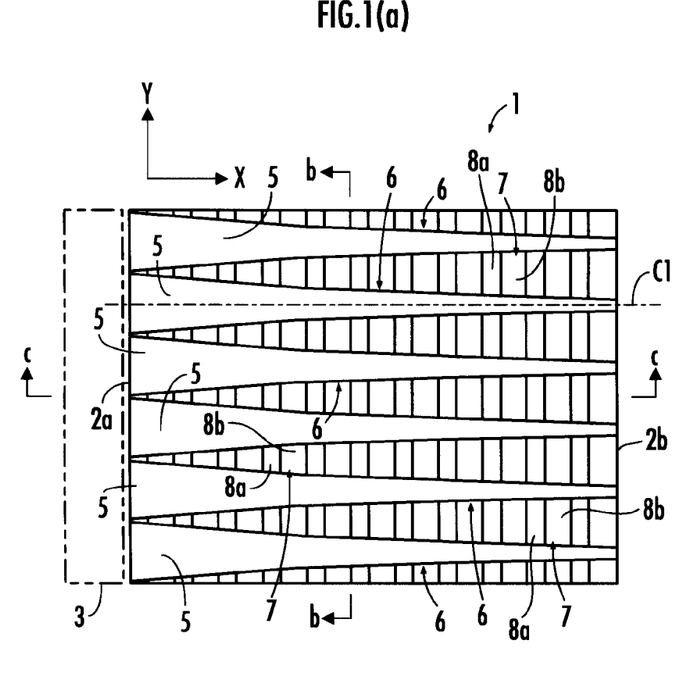
FIG. 1A is a plan view of a light guide plate for a surface light source according to a first embodiment of the present invention.

A first embodiment of the present invention will now be described with reference to FIG. 1 to FIG. 5. First, the structure of a light guide plate for a surface light source according to this embodiment will be described with reference to FIG. 1. FIG. 1A is a plan view of the light guide plate for a surface light source according to this embodiment, FIG. 1B is a sectional view taken along line b-b of FIG. 1A, and FIG. 1C is a sectional view taken along line c-c of FIG. 1A.

Figure 1B:
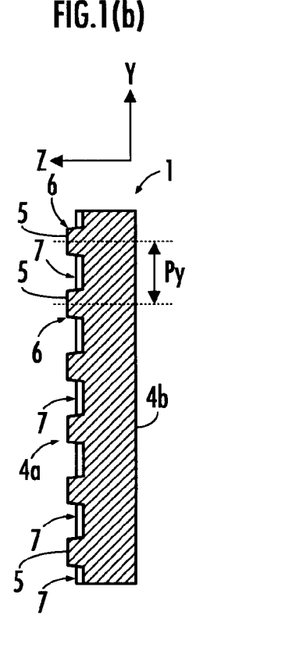
FIG. 1B is a sectional view taken along line b-b of FIG. 1A.
Figure 1C:
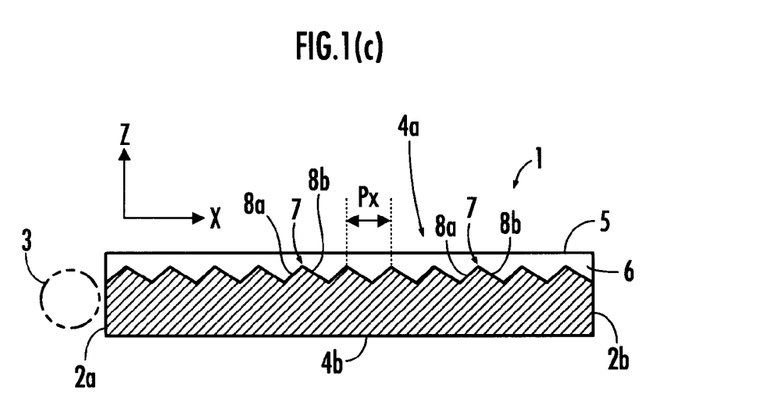
FIG. 1C is a sectional view taken along line c-c of FIG. 1A.

Referring to FIG. 1, a light guide plate for a surface light source 1 (hereinafter, simply referred to as "light guide plate 1") according to this embodiment has a square plate-like appearance shape and is formed by a light-transmitting material such as acrylic resin or polycarbonate resin. One side surface 2a of a pair of side surfaces 2a and 2b, which are opposite to each other, of the light guide plate 1 is a light incident surface (an incident surface of light source light) from a light source 3 to the light guide plate 1. In this embodiment, the light incident surface 2a and the side surface 2b (hereinafter, referred to as "light-anti-incident surface 2b") opposite thereto are flat surfaces parallel to each other. Moreover, the shown light source 3 is a tubular light source such as, for example, a hot cathode fluorescent tube or a cold cathode fluorescent tube, which extends in the longitudinal direction of the light incident surface 2a and is disposed so as to be opposite to the light incident surface 2a. It is also possible to use a light source formed by, for example, an arrangement of a plurality of LEDs, instead of the tubular light source.

One surface 4a of both surfaces 4a and 4b (the front surface and rear surface of the light guide plate 1) in the thickness direction of the light guide plate 1 is a light distribution control surface on which a flat surface 5 and a prism 7 described later are formed. Moreover, the other surface 4b is wholly a mirror-like flat surface. In this embodiment, the flat surface 4b is a light emitting surface of the light guide plate 1. In this instance, a reflective sheet, which is not shown, is polymerized with the light distribution control surface 4a in such a way as to cover the light distribution control surface 4a. Moreover, a prism sheet or a diffusion sheet, which is not shown, is polymerized with the light emitting surface 4b in such a way as to cover the light emitting surface 4b. Note that, however, one or both of the prism sheet and the diffusion sheet may be omitted in some cases.

In the following description, as shown in FIG. 1, the direction perpendicular to the light incident surface 2a is defined as an X-axis direction, the thickness direction of the light guide plate 1 is defined as a Z-axis direction, and a direction orthogonal to the X-axis direction and the Z-axis direction is defined as a Y-axis direction. The Y-axis direction is the longitudinal direction of the light incident surface 2a, and in this embodiment the Y-axis direction is a direction parallel to the light incident surface 2a and to the light emitting surface 4b.

A plurality of flat surfaces 5 extending in the X-axis direction are formed side by side in the Y-axis direction on the light distribution control surface 4a of the light guide plate 1. In this embodiment, a plurality of (as many as the flat surfaces 5) convex portions 6, which extend in the X-axis direction, are formed side by side in the Y-axis direction and integrally with the light guide plate 1 on the light distribution control surface 4a. The cross-sectional shape (the shape on the cross section orthogonal to the X-axis direction) of each of the convex portions 6 is, for example, a trapezoidal shape (or a rectangular shape). The top face of each convex portion 6 is each flat surface 5. The flat surfaces 5 exist on the same plane orthogonal to the Z-axis direction. Note that each of the flat surfaces 5 may be naturally a flat surface polished to a mirror-like finish or may be simply a flat surface like a surface formed in the injection molding of the light guide plate 1. The flat surfaces 5 cause the total internal reflection of the light incident on the light guide plate 1 according to the angle at which the light is incident on the flat surfaces 5. In this embodiment, each flat surface 5 and each convex portion 6 having the flat surface 5 as the top face continuously extend over the entire length of the light distribution control surface 4a in the X-axis direction, as shown in FIGS. 1A and 1C.

Moreover, as shown in FIG. 1A, each flat surface 5 is formed in such a way as to be gradually reduced in the Y-axis direction width as the distance from the light incident surface 2a increases in the X-axis direction (as the distance from the light-anti-incident surface 2b decreases). In this regard, in this embodiment, opposite side edges of each flat surface 5 (the opposite side edges having a distance therebetween in the Y-axis direction) extend having line symmetry about the center line C1 (which is parallel to the X-axis direction) of the width of the flat surface 5 and curving into a spline curve, as shown in FIG. 1A. Moreover, both side walls of each convex portion 6 are also formed so as to curve into a spline curve along the opposite side edges of the flat surface 5 when viewed in the Z-axis direction. Therefore, each convex portion 6 is formed into a plane symmetry shape about the plane orthogonal to the Y-axis direction including the center line C1 of the width of the flat surface 5 as the top face of the convex portion 6.

Since each convex portion 6 and the flat surface 5 as its top face are formed as described above, the Y-axis direction width between the convex portions 6, 6 adjacent to each other gradually increases along with an increase in the distance from the light incident surface 2a in the X-axis direction. Moreover, in this embodiment, every pitch Py (See FIG. 1B) between the two flat surfaces 5, 5 is the same in an arbitrary pair of the flat surfaces 5, 5 adjacent to each other in the Y-axis direction. More specifically, every distance Py between the center lines of the widths of the two flat surfaces 5, 5 is the same. In other words, the convex portions 6 and the flat surfaces 5, which are the top faces thereof, are placed evenly spaced apart in the Y-axis direction on an arbitrary cross section orthogonal to the X-axis direction of the light guide plate 1.

A plurality of prisms 7 extending in the Y-axis direction are formed side by side in the X-axis direction in the areas other than the flat surfaces 5 in the light distribution control surface 4a.

Each prism 7 has a triangular shape in the cross section orthogonal to the Y-axis direction as shown in FIG. 1C and is formed integrally with the light guide plate 1. Each prism 7 has an inclined surface 8a on the light incident surface 2a side and an inclined surface 8b on the light-anti-incident surface 2b side. These inclined surfaces 8a and 8b are parallel in the Y-axis direction and the X-axis direction components of the normal vectors of the inclined surfaces 8a and 8b are reverse to each other. Moreover, the prisms 7 are arranged in the X-axis direction in such a way that the inclined surface 8b of the prism 7 closer to the light incident surface 2a intersects with the inclined surface 8a of the prism 7 closer to the light-anti-incident surface 2b in an arbitrary pair of prisms 7, 7 adjacent to each other in the X-axis direction. Therefore, the inclined surfaces 8a and 8b of the prisms 7 are arranged seamlessly in the X-axis direction so as to alternate continuously in the areas other than the flat surfaces 5 (hereinafter, sometimes referred to as "prism formation part") of the light distribution control surface 4a. In this embodiment, every pitch Px (See FIG. 1C) between two prisms 7, 7 is the same in an arbitrary pair of prisms 7, 7 adjacent to each other in the X-axis direction. In other words, the prisms 7 are placed evenly spaced apart in the X-axis direction on an arbitrary cross section passing through the prism formation part and orthogonal to the Y-axis direction. In this embodiment, every angle of inclination of each of the inclined surfaces 8a and 8b of each prism 7 is the same for every prism 7 for each of the inclined surfaces 8a and 8b.

In this regard, in the light guide plate 1 of this embodiment, the inclined surfaces 8a and 8b of each prism 7 function as a light reflective surface or a light transmitting surface so as to achieve nearly the target light distribution characteristics, with respect to the light distribution characteristics viewed in the Y-axis direction of the light emitted from the light emitting surface 4b (the emitting direction or the degree of directivity of the light), in other words, the light distribution characteristics on the surface orthogonal to the Y-axis direction. Moreover, the angles of inclination of the inclined surfaces 8a and 8b are set so as to achieve the target light distribution characteristics or light distribution characteristics similar thereto on the surface orthogonal to the Y-axis direction at the time of emission, from the light emitting surface 4b, of the light guided into the light guide plate 1 and reflected on the inclined surface 8a or 8b and the light reflected on the reflective sheet polymerized with the light distribution control surface 4a and then passing through the inclined surface 8a or 8b.

The light distribution characteristics of the light emitted from the light emitting surface 4b (hereinafter, simply referred to as "emitted light") are determined dependently of the specifications of a surface light source device having the light guide plate 1 such as, for example, the type of reflective sheet combined with the light guide plate 1, the necessity of the diffusion sheet and the prism sheet or the types of the sheets, the number of diffusion sheets, and the optical properties required for the surface light source device. Moreover, the angles of inclination of the inclined surfaces 8a and 8b are different from each other in general.

Furthermore, the side walls of each convex portion 6 as wall surfaces formed between each flat surface 5 and the inclined surface 8a or 8b of the prism 7 adjacent to the flat surface 5 have a function of controlling the light distribution characteristics of the emitted light viewed in the X-axis direction, in other words, the light distribution characteristics on the surface orthogonal to the X-axis direction by the setting of the angles of inclination of the side walls (the angles of inclination to the surface orthogonal to the Z-axis direction). In this embodiment, the angles of inclination of the side walls of each convex portion 6 are set so as to achieve the target light distribution characteristics or the light distribution characteristics similar thereto, with respect to the light distribution characteristics of the emitted light on the surface orthogonal to the X-axis direction.

Although FIG. 1 shows the pitch Py between the flat surfaces 5 and the pitch Px between the prisms 7 as relatively large in comparison with the size of the light guide plate 1 for convenience of illustration, the pitch Py between the flat surfaces 5 is actually a fine pitch such as, for example, of the order of 50 μm. Moreover, the pitch Px between the prisms 7 is a fine pitch such as, for example, of the order or 15 μm.

More specifically, the light guide plate 1 of this embodiment has flat surfaces 5 whose each width in the Y-axis direction varies in the X-axis direction. Therefore, the percentage of a total area (the percentage of the area viewed in the Z-axis direction, which is hereinafter referred to as "prism density") of the inclined surfaces 8a and 8b of the prism 7 per unit area of the light distribution control surface 4a varies in the X-axis direction. In this embodiment, the inclined surfaces 8a and 8b of the prism 7 are continued in the X-axis direction. Therefore, assuming that Yt is the full length of the light guide plate 1 in the Y-axis direction in the position at a certain distance Xa spaced apart from the light incident surface 2a in the X-axis direction and that Yp is the total length of all prisms 7 existing in the position of the distance Xa in the Y-axis direction (or the length obtained by subtracting the total length of all flat surfaces 5 existing in the position of the distance Xa in the Y-axis direction from Yt), the prism density in the position of the distance Xa (the prism density in the X-axis direction) is represented as a percentage of Yp to Yt.

Figure 2:
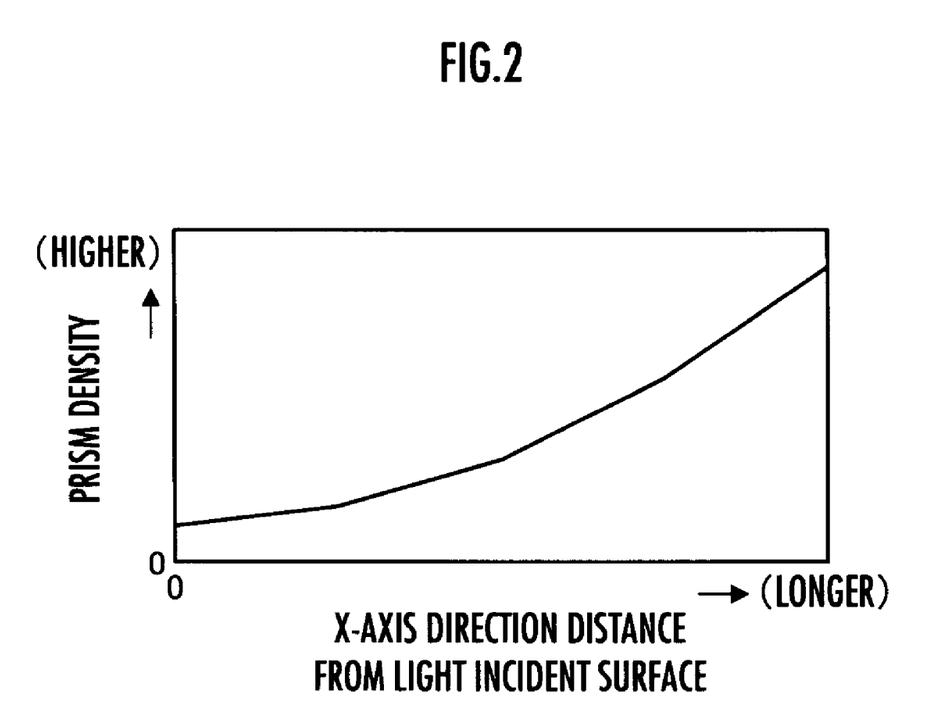
FIG. 2 is a graph illustrating a relationship between a distance (X-axis direction position) from a light incident surface of the light guide plate according to the first embodiment and prism density.

Referring to FIG. 2, there is shown a graph illustrating a relationship between the distance from the light incident surface 2a of the light guide plate 1 in the X-axis direction (X-axis direction position) and the foregoing prism density. In this embodiment, as shown in this graph, the change pattern of the width of the flat surface 5 in the Y-axis direction is set in such a way that the distribution of the prism density in the X-axis direction changes along a curve.

The graph in FIG. 2, however, shows an example of a variation pattern of the prism density in the X-axis direction and thus the prism density has not always to vary along a curve in the X-axis direction. For example, it is possible to cause the prism density to vary linearly in the X-axis direction. In this instance, the Y-axis direction width of each flat surface 5 may vary linearly in the X-axis direction. Regarding the distribution in prism density in the X-axis direction, it is preferable to cause the distribution, in the X-axis direction, of the luminance of the light emitted from the light emitting surface 4b of the light guide plate 1 (the distribution viewed on the surface orthogonal to the Y-axis direction) to be almost uniform. To achieve the uniform distribution, basically it is only required to vary the Y-axis direction width of each flat surface 5 in such a way as to decrease gradually along with an increase in a distance from the light incident surface 2a in the X-axis direction as in this embodiment.

The light guide plate 1 having the above structure is formed by injection molding using, for example, a molding stamper (molding die). In this instance, it is possible to form the molding stamper (a stamper having a mold surface corresponding to the light distribution control surface 4a) as described below. FIGS. 3A to 3D are diagrams for describing an example of a method of the formation.

Figure 3A:
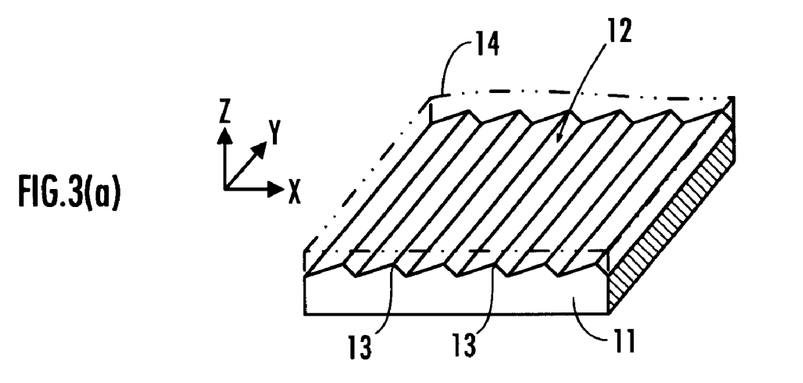
FIGS. 3A to 3D are diagrams for explaining an example of a method of forming the light guide plate according to the first embodiment.

The first step is to remove the convex portions 6 from the light distribution control surface 4a of the light guide plate 1 and then to cut and form a die (not shown), which has a shaped surface having a shape such that prisms continuously extending in the Y-axis direction including the areas where the convex portions 6 have been removed are arranged in the X-axis direction. Thereafter, a stamper 11 shown in FIG. 3A is formed by electroforming or the like on the basis of the die. FIG. 3A is a fragmentary perspective diagram of the stamper 11. The stamper 11 has a shaped surface 12 having the same shape as the die. On the shaped surface 12, convex portions 13 each having the same shape as the prism 7 continuously extend in the Y-axis direction of FIG. 3A and are arranged side by side in the X-axis direction. In FIG. 3, the X-axis direction, the Y-axis direction, and the Z-axis direction are shown so as to correspond to the directions shown in FIG. 1.

Subsequently, the entire shaped surface 12 of the stamper 11 is coated with resist 14 sensitive to ultraviolet light as indicated by a two-dot chain line in FIG. 3A.

Figure 3B:
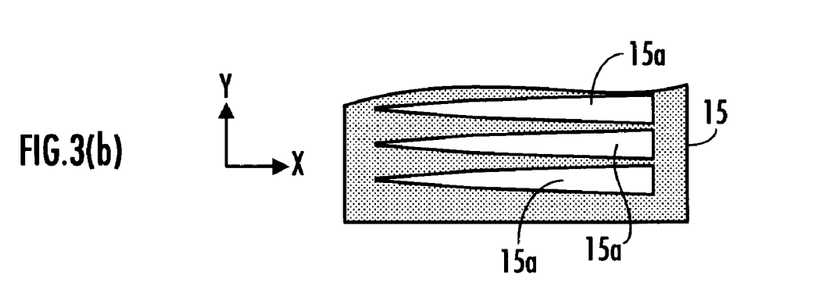

Thereafter, the resist 14 is irradiated with the ultraviolet light with the surface of the resist 14 covered with a mask 15 shown in FIG. 3B. The mask 15 has openings indicated by a plurality of white portions 15a shown in FIG. 3B. Then, the resist 14 is irradiated with the ultraviolet light in the locations of the openings 15a. In this case, the shape pattern of the openings 15a is the same as the shape pattern of the prism formation part of the light distribution control surface 4a of the light guide plate 1 (the shape pattern viewed in the Z-axis direction in FIG. 1).

Figure 3C:
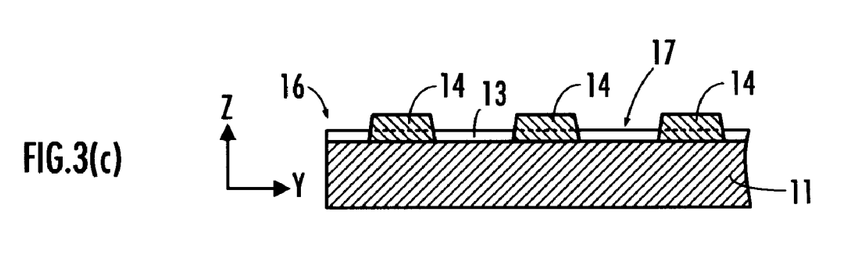

Subsequently, the stamper 11 and the resist 14 are dipped in developer in order to dissolve and remove the ultraviolet irradiated portions of the resist 14. This causes the formation of a stamper with resist 16 formed by the resist 14, which partially remains, and the stamper 11, as shown in FIG. 3C. The front surface 17 of the stamper with resist 16 includes the resist 14 remaining in the portions corresponding to the convex portions 6 on the light distribution control surface 4a of the light guide plate 1 and the exposed convex portions 13 (the portions having the same shape as the prisms 7) of the stamper 11 in the portions (the ultraviolet irradiated portions) corresponding to the prism formation part on the light distribution control surface 4a. Therefore, the front surface 17 of the stamper with resist 16 has the same shaped surface as the light distribution control surface 4a of the light guide plate 1.

Figure 3D:
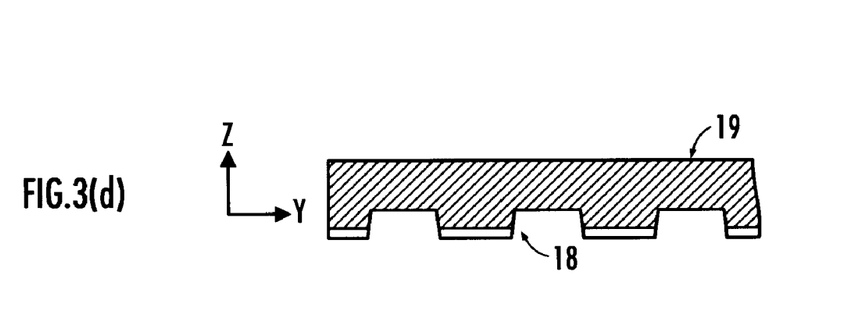

Subsequently, the stamper with resist 16 is fired so as to increase the strength thereof, before forming a molding stamper 19 with a mold surface 18 having a reversed shape of the shaped surface 17 of the stamper with resist 16, as shown in FIG. 3D, using the stamper with resist 16 as a pattern by electroforming or the like. Thereby, the molding stamper 19 is obtained.

Although the resist 14 is of the type in which the ultraviolet irradiated portions of the resist 14 dissolve in the developer in the above example of the forming method, it is also possible to use the type of resist in which the portions other than the ultraviolet irradiated portions dissolve in the developer. In this case, the resist may be irradiated with the ultraviolet light with the resist covered with a mask having openings of the same shape pattern as the shape pattern of the flat surfaces 5 of the light guide plate 1.

The light guide plate 1 of this embodiment is formed by injection molding using the molding stamper 19 formed as described above.

According to the light guide plate 1 of this embodiment described hereinabove, the light distribution characteristics of the emitted light on the surface orthogonal to the Y-axis direction (viewed in the Y-axis direction) are basically defined by the prism formation part on the light distribution control surface 4a. In this case, it is possible to form the prisms 7 in such a way that the inclined surfaces 8a and 8b of each prism 7 incline at desired angles of inclination with accuracy, by using the molding stamper that can be formed in the above forming method. Therefore, it is possible to adjust the light distribution characteristics of the light emitted from the light emitting surface 4b to the target light distribution characteristics with accuracy on the surface orthogonal to the Y-axis direction.

Moreover, the prism formation part on the light distribution control surface 4a includes the inclined surfaces 8a and 8b of the prisms 7 having desired angles of inclination continued with each other in the X-axis direction, and therefore it is possible to reduce the occurrence of diffused light on the light guide plate 1 and the light emission from the light-anti-incident surface 2b. This enables an increase in the amount of light emitted in the target direction or a direction close thereto from the light emitting surface 4b. In other words, this enables a decrease in the amount of light emitted in a direction significantly different from the target direction from the light guide plate 1.

Moreover, each flat surface 5 has a function of reflecting the light incident from the light incident surface 2a on an inner surface and guiding the incident light to the light-anti-incident surface 2b side at the other end. This enables a decrease in unevenness of luminance in the X-axis direction of the light guide plate 1.

Moreover, it is possible to vary the prism density in the X-axis direction by varying the Y-axis direction width of each flat surface 5, without varying the height of each prism 7 or a pitch between the adjacent prisms 7 in the X-axis direction. Consequently, this enables uniformity of the luminance distribution in the X-axis direction (the luminance distribution in the X-axis direction viewed on the surface orthogonal to the Y-axis direction) of the emitted light.

Furthermore, it is possible to adjust the light distribution characteristics of the emitted light on the surface orthogonal to the X-axis direction (viewed in the X-axis direction) to the target light distribution characteristics or to the light distribution characteristics similar thereto by previously setting the angles of inclination of the wall surfaces formed between each flat surface and each prism 7, in other words, the side walls of the convex portion 6 to appropriate angles of inclination.

Figure 4:
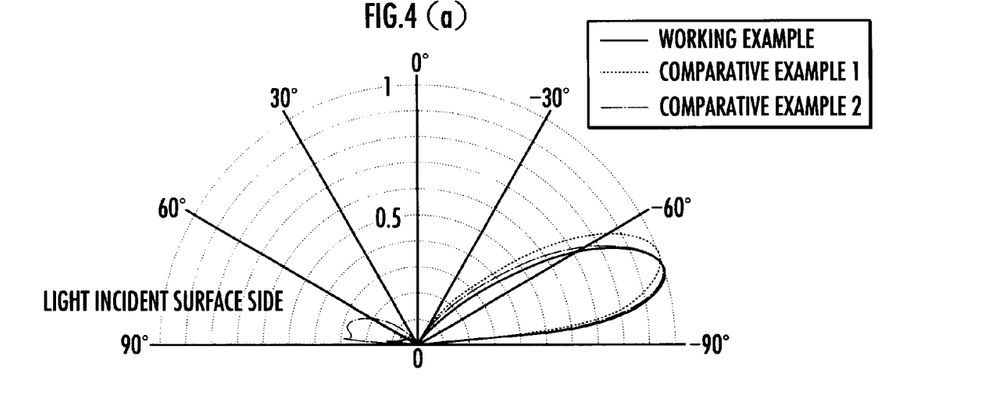
FIGS. 4A to 4C are graphs illustrating results of measurements of the light distribution characteristics of an emitted light of the light guide plate of the first embodiment and comparative examples.
Figure 5:
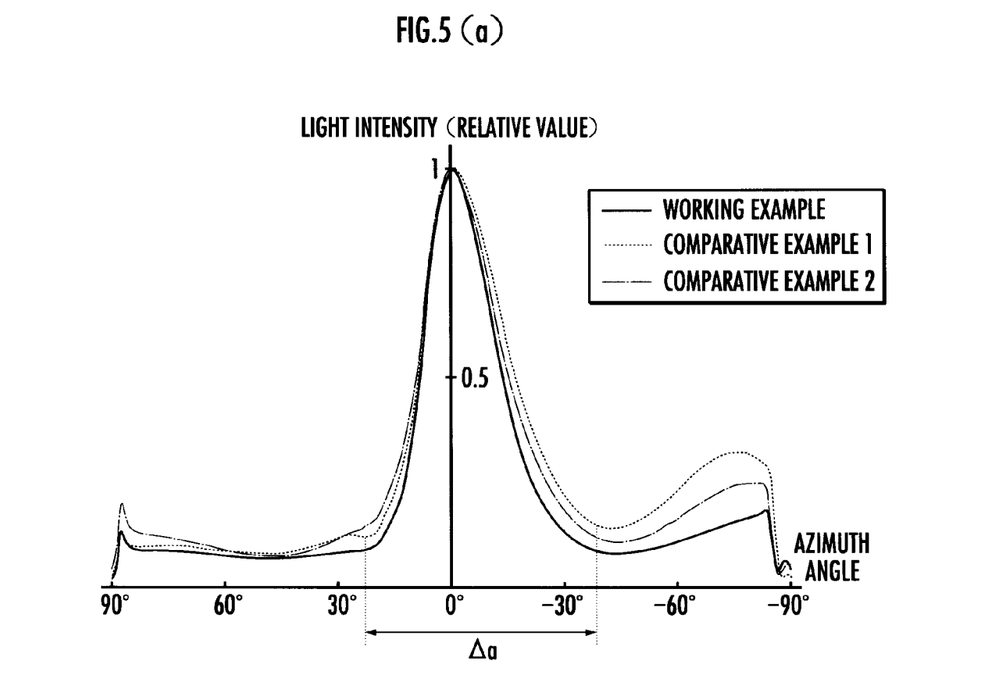
FIG. 5A is a graph illustrating the light distribution characteristics shown in FIG. 4B with the abscissa axis representing an azimuth angle and the ordinate axis representing the light intensity (relative value).
FIG. 5B is a graph illustrating a percentage of lost light calculated from the graph shown in FIG. 5A.

Subsequently, the verification result of the effect of the light guide plate 1 according to this embodiment will be described with reference to FIG. 4 and FIG. 5. The present inventor verified the light distribution characteristics of the light guide plate 1 according to this embodiment. The light guide plate 1 formed for the verification is a light guide plate for use in a surface light source in which a prism sheet is polymerized with the light emitting surface 4b of the light guide plate (hereinafter, referred to as "light guide plate 1 of Working Example"). The angles of inclination of the inclined surfaces 8a and 8b of each prism 7 of the light guide plate 1 of Working Example and the angles of inclination of the two side walls of each convex portion 6 are set to the angles of inclination that cause the traveling direction of the light emitted from the light emitting surface 4b refracted by and passing through the prism sheet polymerized with the light emitting surface 4b to point almost in the Z-axis direction.

Moreover, the inventor formed two types of light guide plates of Comparative Examples for comparison with the light distribution characteristics of the light guide plate 1 of Working Example. These two types of light guide plates are different from the light guide plate 1 of Working Example only in the structure of the light distribution control surface opposite to the light emitting surface, having a conventionally known dot pattern formed on the light distribution control surface. In this instance, the dots on the first light guide plate (hereinafter, referred to as "light guide plate of Comparative Example 1") of the two types of light guide plates each have the shape of a triangular pyramid, and the dots on the second light guide plate (hereinafter, referred to as "light guide plate of Comparative Example 2") each have the shape of a disc.

The light source light is guided from the light source 3 to each of the light guide plates of Working Example, Comparative Example 1, and Comparative Example 2 to measure the light distribution characteristics on the light emitting surface side. The result of the measurements will be described below with reference to FIGS. 4A, 4B, 4C, 5A, and 5B.

FIG. 4A shows the light distribution characteristics of emitted light on the surface orthogonal to the Y-axis direction (the emitted light in a situation where the prism sheet is removed). FIG. 4B shows the light distribution characteristics of light having passed through the prism sheet on the surface orthogonal to the Y-axis direction. FIG. 4C shows the light distribution characteristics of the light having passed through the prism sheet on the surface orthogonal to the X-axis direction. The angular values in the circumferential direction in each of FIGS. 4A to 4C represent the azimuth angles of the light traveling direction on the corresponding surface. Moreover, the values in the radial direction (the values on the circumference indicated by a broken line in each of FIGS. 4A to 4C) represent the relative values (the relative values normalized with the peak value as "1") of light intensity.

As shown in FIG. 4A to 4C, it is understood that the light distribution characteristics of the light guide plate 1 of Working Example show a high degree of convergence of the light traveling direction into one specific direction and less amount of light traveling in other directions in comparison with Comparative Examples 1 and 2 on all of the surfaces orthogonal to the Y-axis direction (See FIGS. 4A and 4B) and the surface orthogonal to the X-axis direction (See FIG. 4C).

In addition, FIG. 5A is a graph illustrating the light distribution characteristics shown in FIG. 4B with the abscissa axis representing the azimuth angle and the ordinate axis representing the light intensity (relative value). The present inventor found the percentage of the total amount of lost light (hereinafter, simply referred to as "percentage of lost light") to the total amount of light having passed through the prism sheet, on the basis of the graph in FIG. 5A, with respect to Working Example, Comparative Example 1, and Comparative Example 2. The term "lost light" means light whose azimuth angle of the traveling direction after passing through the prism sheet (the azimuth angle on the surface orthogonal to the Y-axis direction) deviates from a given angle range indicated by Δa in FIG. 5A. Moreover, the angle range Δa is a range of azimuth angle of the light traveling direction that effectively contributes to the visibility of the liquid crystal display in the case where the light guide plates of Working Example, Comparative Example 1, and Comparative Example 2 are used as, for example, light guide plates for a surface light source as a backlight of the liquid crystal display. That is the target range of the azimuth angle of the light traveling direction. Therefore, the lost light is a light traveling in the direction that hardly contributes to the visibility of the liquid crystal display.

The percentage of the lost light is obtained as a ratio of B to A, where A is a value obtained by integrating the light intensities in the graph in FIG. 5A corresponding to Working Example, Comparative Example 1, and Comparative Example 2, respectively, in the overall angle range (the range from −90 deg to 90 deg) (in other words, the value is the total area in the overall angle range of the graph) and B is a value obtained by integrating the light intensities in the graph in the angle range excluding the given angle range Δa (in other words, the value is the total area in the angle range excluding the angle range Δa of the graph).

FIG. 5B shows the percentages of the lost light obtained as described above, with respect to Working Example, Comparative Example 1, and Comparative Example 2. The percentages of the lost light in the Working Example, Comparative Example 1, and Comparative Example 2 are 31.7%, 36.6%, and 40.3%, respectively. As shown in FIG. 5B, the percentage of the lost light is low in the light guide plate 1 of Working Example in comparison with the light guide plates of Comparative Example 1 and Comparative Example 2.

Moreover, the present inventor measured the luminance distributions of the emitted light on the light emitting surface and calculated an average of the luminance, with respect to the light guide plates of Working Example, Comparative Example 1, and Comparative Example 2. The luminance averages of Working Example, Comparative Example 1, and Comparative Example 2 were 11046 [$cd/m^2$], 10545 [$cd/m^2$], and 10767 [$cd/m^2$], respectively. Therefore, it is confirmed that the luminance average of the light guide plate 1 of Working Example increases by 3 to 5% or so in comparison with the luminance averages of Comparative Example 1 and Comparative Example 2.

From the above description, it is understood that the light guide plate 1 of this embodiment is capable of reducing the amount of emitted light deviating from the target traveling direction or a direction similar thereto (namely, the lost light described above). Consequently, it is understood that the light guide plate 1 of this embodiment is capable of causing the light to be emitted in the target traveling direction or a direction similar thereto efficiently.

Second Embodiment

Figure 6A:
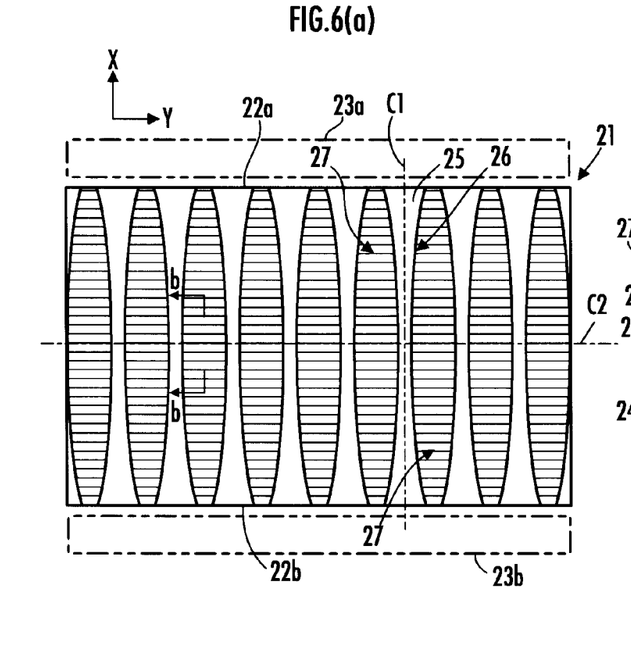
FIG. 6A is a plan view of a light guide plate for a surface light source according to a second embodiment of the present invention, viewed in the thickness direction (Z-axis direction) thereof.
Figure 6B:
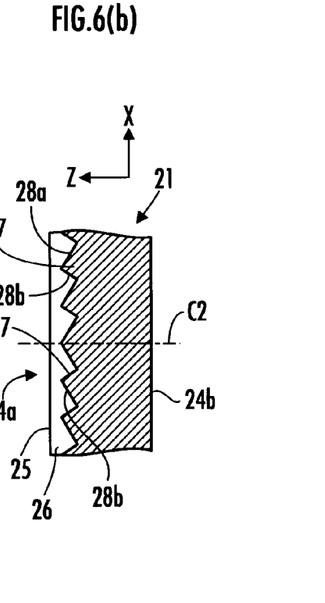
FIG. 6B is a diagram illustrating an expanded sectional view taken along line b-b of FIG. 6A.

Subsequently, a second embodiment of the present invention will be described with reference to FIG. 6. FIG. 6A shows a plan view of a light guide plate for a surface light source 21 of this embodiment, viewed in the thickness direction (Z-axis direction) thereof, and FIG. 6B shows a diagram illustrating an expanded sectional view taken along line b-b of FIG. 6A. The light guide plate for a surface light source 21 (hereinafter, simply referred to as "light guide plate 21") of this embodiment differs from the light guide plate 1 of the first embodiment only in a part of the configuration, and therefore the description will be made focusing on the differences. Furthermore, detailed descriptions will be omitted here, regarding the same components as those of the light guide plate 1 of the first embodiment.

The appearance shape and material of the light guide plate 21 of this embodiment are the same as the light guide plate of the first embodiment. In the light guide plate 21 of this embodiment, however, both of a pair of side surfaces 22a and 22b opposite to each other are light incident surfaces, and light source light is guided into the light guide plate 21 from two light sources 23a and 23b placed so as to be opposite to the light incident surfaces 22a and 22b, respectively. The light sources 23a and 23b may be the same as the light source 3 described in the first embodiment. In this embodiment, the light incident surfaces 22a and 22b are flat surfaces parallel to each other.

Moreover, in the light guide plate 21 of this embodiment, one surface 24a of both surfaces 24a and 24b in the thickness direction (Z-axis direction) of the light guide plate 21 is a light distribution control surface and the other surface 24b is a planar light emitting surface, similarly to the first embodiment. Moreover, a plurality of flat surfaces 25 extending in a direction (X-axis direction) perpendicular to the light incident surfaces 22a and 22b are formed side by side at regular pitches in a direction (Y-axis direction orthogonal to the X-axis direction and the X-axis direction) parallel to the light incident surfaces 22a and 22b on the light distribution control surface 24a. Furthermore, in the prism formation part, which is areas other than the flat surfaces 25 in the light distribution control surface 24a, a plurality of prisms 27 extending in the Y-axis direction are formed side by side at regular pitches in the X-axis direction integrally with the light guide plate 21.

Similarly to the first embodiment, the flat surfaces 25 are top faces of a plurality of convex portions 26 formed integrally with the light guide plate 21 on the light distribution control surface 24a. Moreover, these flat surfaces 25 are provided in the same plane orthogonal to the Z-axis direction. Moreover, the flat surfaces 5 and the convex portions 6 each having the flat surface 5 as a top face continuously extend over the entire length of the light distribution control surface 4a in the X-axis direction.

The Y-axis direction width of each flat surface 25 in this embodiment varies in the X-axis direction in a form different from the first embodiment. More specifically, when the light distribution control surface 24a is viewed in the Z-axis direction, a portion on the light incident surface 22a side of each flat surface 25 from the plane C2 orthogonal to the X-axis direction in the region of the center of the X-axis direction width (a distance between the light incident surfaces 22a and 22b) of the light guide plate 21 is formed so that the Y-axis direction width of the portion decreases gradually along with an increase in the distance from the light incident surface 22a in the X-axis direction, as shown in FIG. 6A. On the other hand, the portion on the light incident surface 22b side of each flat surface 25 from the plane C2 is formed so that the Y-axis direction width of the portion decreases gradually along with an increase in the distance from the light incident surface 22b in the X-axis direction. Therefore, the Y-axis direction width of each flat surface 25 is minimum on the plane C2 (the intermediate position between the light incident surfaces 22a and 22b).

In this embodiment, the plane C2 passes through the center line of the X-axis direction width of the light guide plate 21. Moreover, in this embodiment, the portion on the light incident surface 22a side from the plane C2 and the portion on the light incident surface 22b side from the plane C2 in the opposite side edges of each flat surface 25 (the opposite side edges having a distance therebetween in the Y-axis direction) have a form with line symmetry about the center line C1 of the width of the flat surface 25 and extend curving into a spline curve, similarly to the first embodiment. Much the same is true on the side walls of each convex portion 26.

Additionally, the minimum Y-axis direction width of each flat surface 25 on the plane C2 means the maximum distribution of the prism density in the X-axis direction described in the first embodiment on the plane C2. In this embodiment, the Y-axis direction width of each flat surface 25 varies in the X-axis direction as described above. Thereby, the prism density decreases along with a decrease in the distance from the light incident surface 22a on the light incident surface 22a side from the plane C2. On the other hand, the prism density decreases along with a decrease in the distance from the light incident surface 22b on the light incident surface 22b side from the plane C2.

Each prism 27 formed in the prism formation part of the light distribution control surface 4a has a triangular shape in the cross section orthogonal to the Y-axis direction, as shown in FIG. 6B. Moreover, each prism 27 has an inclined surface 28a on the light incident surface 22a side and an inclined surface 28b on the light incident surface 22b side, similarly to the first embodiment. Furthermore, similarly to the first embodiment, the inclined surfaces 28a and 28b of the prisms 27 are arranged alternately and continuously in the X-axis direction in such a way that the inclined surface 28b of the prism 27 closer to the light incident surface 22a intersects with the inclined surface 28a of the prism 27 closer to the light incident surface 28b in an arbitrary pair of prisms 27, 27 adjacent to each other in the X-axis direction.

In this embodiment, however, the prism 27 on the light incident surface 22a side from the plane C2 differs from the prism 27 on the light incident surface 22b side from the plane C2 in the angle of inclination of the inclined surface 28a on the light incident surface 22a side. Moreover, the prism 27 on the light incident surface 22a side from the plane C2 differs from the prism 27 on the light incident surface 22b side from the plane C2 in the angle of inclination of the inclined surface 28b on the light incident surface 22b side. This is because the inclined surfaces 28a and 28b of the prism 27 on the light incident surface 22a side from the plane C2 mainly function as a reflective surface or a light transmitting surface for the light incident from the light incident surface 22a, and the inclined surfaces 28a and 28b of the prism 27 on the light incident surface 22b side from the plane C2 mainly function as a reflective surface or a light transmitting surface for the light incident from the light incident surface 22b.

In this instance, the angles of inclination of the inclined surfaces 28a and 28b of the prism 27 on the light incident surface 22a side from the plane C2 (the angle of inclination relative to the plane orthogonal to the Z-axis direction) is set in such a way that the light distribution characteristics of the light emitted from a light emitting surface 24b (the light distribution characteristics on the surface orthogonal to the Y-axis direction) after the light is incident from the light incident surface 22a are adjusted to the target light distribution characteristics or to the light distribution characteristics similar thereto. Similarly, the angles of inclination of the inclined surfaces 28a and 28b of the prism 27 on the light incident surface 22b side from the plane C2 is set in such a way that the light distribution characteristics of the light emitted from a light emitting surface 24b (the light distribution characteristics on the surface orthogonal to the Y-axis direction) after the light is incident from the light incident surface 22b are adjusted to the target light distribution characteristics or to the light distribution characteristics similar thereto.

In this embodiment, the angles of inclination of the inclined surfaces 28a and 28b on the light incident surface 22a side from the plane C2 are the same for each of the inclined surfaces 28a and 28b. Similarly, the angles of inclination of the inclined surfaces 28a and 28b on the light incident surface 22b side from the plane C2 are the same for each of the inclined surfaces 28a and 28b.

The structure of the light distribution control surface 24a of the light guide plate 21 described hereinabove is the same as the first embodiment. In addition, it is possible to form the light guide plate 21 of this embodiment using the same forming method as the first embodiment.

The light guide plate 21 of this embodiment also generates the same effect as the light guide plate 1 of the first embodiment.

Third Embodiment

Figure 7:
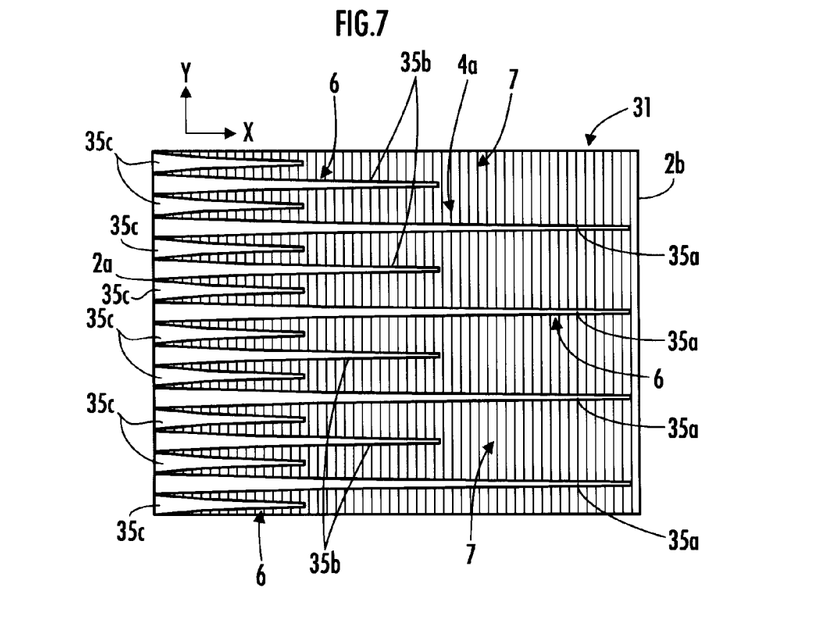
FIG. 7 is a plan view of a light guide plate for a surface light source according to a third embodiment of the present invention, viewed in the thickness direction (Z-axis direction) thereof.

Subsequently, a third embodiment of the present invention will be described with reference to FIG. 7. FIG. 7 shows a plan view of a light guide plate for a surface light source 31 according to this embodiment, viewed in the thickness direction (Z-axis direction) thereof. The light guide plate for a surface light source 31 (hereinafter, simply referred to as "light guide plate 31") of this embodiment differs from the light guide plate 1 of the first embodiment only in a part of the configuration, and therefore the description will be made focusing on the differences. Detailed descriptions will be omitted here, regarding the same components as those of the light guide plate 1 of the first embodiment.

Referring to FIG. 7, the light guide plate 31 of this embodiment differs from the light guide plate 1 of the first embodiment only in the formation patterns of flat surfaces 35a, 35b, and 35c in the light distribution control surface 4a, and other areas are the same as in the light guide plate 1. Therefore, in FIG. 7, the same components as the light guide plate 1 are denoted by the same reference numerals as the light guide plate 1.

In this instance, the plurality of flat surfaces 35a, 35b, and 35c formed on the light distribution control surface 4a are classified into a plurality of groups in this embodiment. In the illustrated example, the flat surfaces are classified into the groups: a group of flat surfaces 35a to which suffix "a" is attached; a group of flat surfaces 35b to which suffix "b" is attached; and a group of flat surfaces 35c to which suffix "c" is attached. Moreover, the X-axis direction lengths of the flat surfaces 35a, 35b, and 35c of the respective groups differ from each other. More specifically, the flat surface 35a extends from the position of the light incident surface 2a almost over the entire X-axis direction length of the light guide plate 31. Furthermore, the flat surface 35b extends from the position of the light incident surface 2a over a length shorter than the flat surface 35a in the X-axis direction. Still further, the flat surface 35c extends from the position of the light incident surface 2a over a length shorter than the flat surface 35b in the X-axis direction. The flat surfaces 35a, 35b, and 35c are placed side by side in the Y-axis direction at a regular pitch for each of the groups. In this instance, the flat surfaces 35a, 35b, and 35c are arranged in such a way that the flat surface 35a and the flat surface 35b each between the flat surfaces 35c, 35c adjacent to each other in the Y-axis direction alternate in the Y-axis direction in this embodiment.

The structure of the light guide plate 31 other than described above is the same as in the light guide plate 1 of the first embodiment. In this embodiment, the lengths of the flat surfaces 35a, 35b, and 35c differ from each other. Therefore, a convex portion 36 with the flat surface 35a as a top face, a convex portion 36 with the flat surface 35b as a top face, and a convex portion 36 with the flat surface 35c as a top face differ from each other in the X-axis direction length.

The light guide plate 31 of this embodiment also generates the same effect as the light guide plate 1 of the first embodiment.

Moreover, according to the light guide plate 31 of this embodiment, it is possible to vary the prism density largely in the X-axis direction, without largely varying the Y-axis direction widths of the flat surfaces 35a, 35b, and 35c in the X-axis direction. In the case where the prism density is to be largely varied in the X-axis direction in the light guide plate 1 of the first embodiment, a relatively large width is required for the Y-axis direction width of each flat surface 5 at one end, which is closer to the light incident surface 2a. Therefore, the prism formation part, which exists at the location closer to the light incident surface 2a on the light distribution control surface 4a, becomes gradually sparse in the Y-axis direction. In this case, the image of the flat surfaces 5 at the location closer to the light incident surface 2a is easily visually recognized when the light emitted from the light emitting surface 4b of the light guide plate 1 is used as a backlight of a liquid crystal display.

On the other hand, in the light guide plate 31 of this embodiment, the Y-axis direction widths of the flat surfaces 35a, 35b, and 35c need to be relatively small, even in the case of causing the prism density to vary largely in the X-axis direction. This enables a dense prism formation part in the Y-axis direction, which exists at the location closer to the light incident surface 2a on the light distribution control surface 4a. As a result, it is possible to prevent the situation where the image of the flat surfaces 35a, 35b, and 35c at the location closer to the light incident surface 2a is visually recognized when using the light emitted from the light emitting surface 4b of the light guide plate 1 as a backlight.

Additionally, in the case where a pair of side surfaces 32a and 32b, which are opposite to each other, of the light guide plate 31 are light incident surfaces as in the second embodiment, it is only required to form a plurality of groups of flat surfaces having different lengths in the X-axis direction, as in the third embodiment, in the area on the light incident surface 32a side from the plane C2 and the area on the light incident surface 32b side from the plane C2. In this case, the longest flat surface in the area on the light incident surface 32a side from the plane C2 may be connected to the longest flat surface in the area on the light incident surface 32b side from the plane C2 in the X-axis direction.

Fourth Embodiment

Figure 8A:
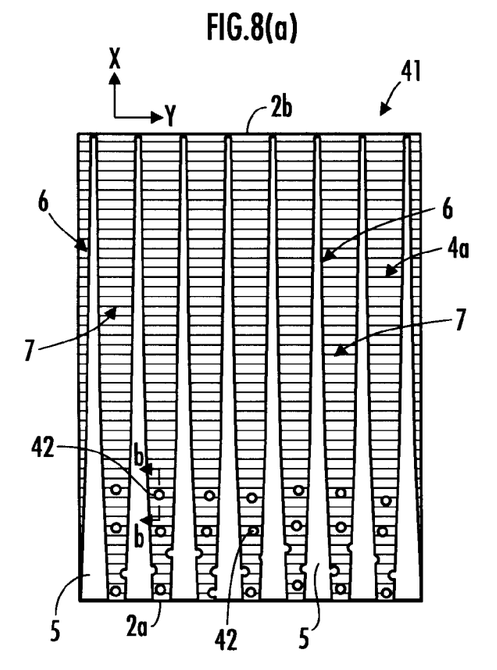
FIG. 8A is a plan view of a light guide plate 41 for a surface light source according to a fourth embodiment of the present invention, viewed in the thickness direction (Z-axis direction) thereof.
Figure 8B:
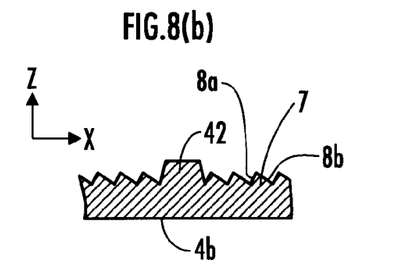
FIGS. 8B and 8C are diagrams illustrating expanded sectional views taken along line b-b of FIG. 8A.

Subsequently, a fourth embodiment of the present invention will be described with reference to FIG. 8. FIG. 8A shows a plan view of a light guide plate for a surface light source 41 of this embodiment, viewed in the thickness direction (Z-axis direction) thereof, and FIG. 8B shows a diagram illustrating an expanded sectional view taken along line b-b of FIG. 8A. The light guide plate for a surface light source 41 (hereinafter, simply referred to as "light guide plate 41") of this embodiment differs from the light guide plate 1 of the first embodiment only in a part of the configuration, and therefore the description will be made focusing on the differences. Furthermore, detailed descriptions will be omitted here, regarding the same components as those of the light guide plate 1 of the first embodiment.

Referring to FIGS. 8A and 8B, the light guide plate 41 of this embodiment differs from the light guide plate 1 of the first embodiment in that a plurality of disc-like (or truncated cone-like) dots 42 are formed in a scattered manner in the area closer to the light incident surface 2a of the light distribution control surface 4a. The dots 42 are formed integrally with the light guide plate 41. The structure of the light guide plate 41 other than the above is the same as in the first embodiment. Therefore, the same components as those of the light guide plate 1 are denoted by the same reference numerals as the light guide plate 1 in FIG. 8.

Figure 8C:
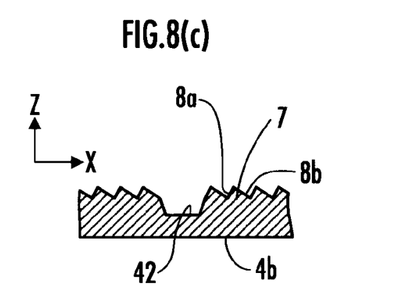

In this instance, each of the dots 42 is a convex portion projecting toward the opposite side to the light emitting surface 4b further than the prism 7 on the light distribution control surface 4a, as shown in FIG. 8B. Alternatively, each of the dots 42 is a concave portion dented to the light emitting surface 4b side further than the prism on the light distribution control surface 4a, as shown in FIG. 8C.

The structure of the light guide plate 41 other than described above is the same as the light guide plate 1 of the first embodiment.

The light guide plate 41 of this embodiment also generates the same effect as the light guide plate 1 of the first embodiment. In this case, the light guide plate 41 of this embodiment is preferable when a plurality of point sources such as LEDs are used as a light source for guiding the light source light into the light incident surface 2a. More specifically, the light guide plate 41 has the plurality of dots 42 in the area closer to the light incident surface 2a, by which the light incident on the light guide plate 41 from the light incident surface 2a is diffused by the dots 42 immediately after the incidence. Accordingly, even if the plurality of point sources such as LEDs are used as a light source, it is possible to propagate the light source light, which has been guided into the light guide plate 41, to every place inside the light guide plate 41.

Moreover, when a cold cathode fluorescent tube is used as the light source, light is scant in the vicinity of the electrodes of the fluorescent tube. Even in such a case, the light guide plate 41 of this embodiment is capable of preventing the insufficiency of the luminance of light, which is emitted from the light emitting surface 4b of the light guide plate 41, in the vicinity of the electrodes.

Additionally, if the pair of side surfaces 32a and 32b, which are opposite to each other, of the light guide plate 31 are light incident surfaces as in the second embodiment, it is only required to form dots in a scattered manner in the area closer to the light incident surface 32a and the area closer to the light incident surface 32b.

[Variations]

Subsequently, other variations of the above embodiments will be described below.

Figure 9:
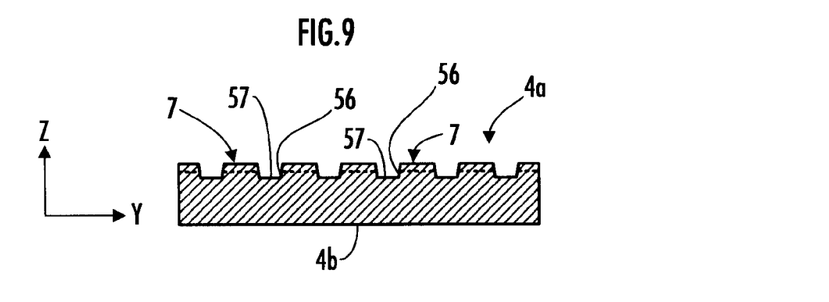
FIG. 9 is a sectional view of a light guide plate according to a variation of the embodiment of the present invention.

In the first embodiment, the flat surface 5 is formed on the top face of the convex portion 6 formed in such a way as to project toward the opposite side to the light emitting surface 4b further than the prism 7 on the light distribution control surface 4a. Alternatively, it is possible to form a concave portion 56 (groove) in such a way as to dent to the light emitting surface 4b further than the prism 7 on the light distribution control surface 4a and to form a bottom surface of the concave portion 56 as a flat surface 57, as shown in FIG. 9. The same applies to the second to fourth embodiments. FIG. 9 is a diagram illustrating a cross section taken along line b-b of FIG. 1A in this variation.

Although one surface 4a of the surfaces 4a and 4b in the Z-axis direction (in the thickness direction) of the light guide plate 1 is a light distribution control surface and the other surface 4b is a light emitting surface in the first embodiment, the light distribution control surface and the light emitting surface may be the same surface. Moreover, the surfaces 4a and 4b may be the light distribution control surfaces with flat surfaces and prisms formed thereon. These also apply to the second to fourth embodiments.

Although the light emitting surface 4b is a planar flat surface in the first embodiment, a plurality of prisms extending in the X-axis direction may be formed side by side in the Y-axis direction on the light emitting surface 4b. The same applies to the second to fourth embodiments.

Moreover, in the first embodiment, the Y-axis direction width of each flat surface 5 varies in the X-axis direction with the same form as in every flat surface 5. Alternatively, the width may vary in the X-axis direction in a mode depending on each flat surface 5 or on the predetermined group each flat surface 5 belongs to. Moreover, the pitch between the flat surfaces 5, 5 adjacent to each other in the Y-axis direction may vary in the Y-axis direction. This enables the prism density to vary in the Y-axis direction. Consequently, it is possible to set the luminance distribution of the emitted light in the Y-axis direction to a desired distribution. These also apply to the second to fourth embodiments.

Moreover, although the X-axis direction widths of the inclined surfaces 8a and 8b of each prism 7 viewed in the Z-axis direction and the pitch between the prisms 7 adjacent to each other in the Y-axis direction are the same for each prism in the first embodiment, the widths and the pitch may vary in the X-axis direction. For example, the X-axis direction widths of the inclined surfaces 8a and 8b of each prism 7 may be increased along with an increase in the distance from the light incident surface 2a in the X-axis direction. Alternatively, the pitch between the prisms 7 may be reduced along with an increase in the distance from the light incident surface 2a in the X-axis direction. Moreover, each flat surface may be located between the prisms 7 so as to prevent intersection between one inclined surface 8a and the other inclined surface 8b of the prisms 7, 7 adjacent to each other in the X-axis direction. These also apply to the second to fourth embodiments.

Furthermore, in the first embodiment, the light guide plate 1 has the form of a square plate whose thickness is almost constant in the X-axis direction. Alternatively, the light guide plate 1 may have a thickness gradually decreasing from the light incident surface 2a side toward the light-anti-incident surface 2b side over the entire length of the light guide plate 1 in the X-axis direction (may be wedge-shaped in the cross section orthogonal to the Y-axis direction). Alternatively, the light guide plate 1 may have a thickness that gradually decreases toward the light-anti-incident surface 2b only in the area closer to the light incident surface 2a while the thickness is substantially constant in other areas (wedge-shaped in the cross section orthogonal to the Y-axis direction only in the area closer to the light incident surface 2a). The same applies to the third and fourth embodiments. Furthermore, if the side surfaces 22a and 22b of the light guide plate 21 are light incident surfaces as in the second embodiment, the thickness of the light guide plate 21 may be gradually reduced from each of the light incident surfaces 22a and 22b to the position of the plane C2 between the light incident surfaces 22a and 22b. Alternatively, the thickness of the light guide plate 21 may be gradually reduced from each of the light incident surfaces 22a and 22b only in the areas closer to the light incident surfaces 22a and 22b.

Moreover, although the light incident surface 2a is a flat surface in the first embodiment, it is possible to form fine unevenness on the light incident surface 2a or to form a plurality of grooves extending in the thickness direction. In this instance, each flat surface may extend in a direction generally perpendicular to the entire light incident surface 2a (for example, a direction perpendicular to a plane containing the edges of the outer periphery of the light incident surface 2a). Also in the case where the light incident surface 2a is a flat surface, the extending direction of each flat surface need not be strictly perpendicular to the light incident surface 2a, but may be slightly inclined to the perpendicular direction. These also apply to the second to fourth embodiments.

The terms "perpendicular," "orthogonal," and "parallel" in this specification need not have strict meanings of "perpendicular," "orthogonal," and "parallel" as described above, but departures from the strict meanings of "perpendicular," "orthogonal," and "parallel" are allowed for the directions represented by these terms.

What is claimed is:

1. A light guide plate for a surface light source, the light guide plate having at least one of a pair of side surfaces opposite to each other as a light incident surface, from which light source light is guided, wherein:

at least one of both surfaces of the light guide plate in a thickness direction thereof is a light distribution control surface for adjusting light distribution characteristics of light emitted from the light guide plate, the light distribution control surface having:

a plurality of flat surfaces formed thereon which extend in a direction perpendicular to the light incident surface and which are arranged side by side in a longitudinal direction of the light incident surface on the light distribution control surface, each of the plurality of flat surfaces is formed in such a way as to vary in width in the longitudinal direction of the light incident surface in the direction perpendicular to the light incident surface; and a plurality of prisms formed thereon which extend in the longitudinal direction of the light incident surface in areas other than the flat surfaces of the light distribution control surface, the plurality of prisms being arranged in the direction perpendicular to the light incident surface, and each prism from among the plurality of prisms having a shape of triangle when viewed in the longitudinal direction of the light incident surface.

2. The light guide plate for a surface light source according to claim 1, wherein the plurality of prisms are formed in such a way that an inclined surface of a first prism on a second prism side intersects with an inclined surface of the second prism on the first prism side, where the first prism and the second prism are two arbitrary prisms adjacent to each other in a parallel direction thereof.

3. The light guide plate for a surface light source according to claim 1, wherein the plurality of flat surfaces are classified into a plurality of groups and the lengths of the plurality of flat surfaces in the direction perpendicular to the light incident surface are set to lengths depending on each of the groups.

4. The light guide plate for a surface light source according to claim 1, wherein a plurality of convex or concave dots are formed in a scattered manner in areas closer to the light incident surface of the light distribution control surface.

5. The light guide plate for a surface light source according to claim 1, wherein each of the plurality of flat surfaces has a polished mirror-like finish.

6. The light guide plate for a surface light source according to claim 1, wherein the width of each of the plurality of flat surfaces decreases as the distance from the light incident surface increases.

7. The light guide plate for a surface light source according to claim 1, wherein the plurality of flat surfaces are provided to have a uniform pitch between adjacent flat surfaces.

8. The light guide plate for a surface light source according to claim 1, wherein the plurality of prisms are provided to have a uniform pitch between adjacent prisms.

9. The light guide plate for a surface light source according to claim 1, wherein each of the plurality of prisms includes a first inclined surface having a first angle of inclination and a second inclined surface having a second angle of inclination different from the first angle of inclination.

10. The light guide plate for a surface light source according to claim 1, wherein a prism density on the light distribution control surface increases as a distance from the light incident surface increases.

11. The light guide plate for a surface light source according to claim 1, wherein the light distribution control surface is provided opposite to a flat light emitting surface of the light guide plate, and the plurality of flat surfaces have a first height relative to the light emitting surface, the plurality of prisms have a second height at an apex of the triangle shape relative to the light emitting surface, and the plurality of prisms have a third height at a base of the triangle shape relative to the light emitting surface, wherein the third height is less than the second height and the second height is less than the first height.

12. The light guide plate for a surface light source according to claim 1, wherein at least a portion of the plurality of prisms are provided in a recess defined between the plurality of flat surfaces on the light distribution control surface.

13. The light guide plate for a surface light source according to claim 1, wherein the light incident surface and the light distribution control surface are each provided on a different surface of the light guide plate.

14. The light guide plate for a surface light source according to claim 1, wherein the light distribution control surface extends perpendicularly from the light incident surface.

15. A light guide plate for a surface light source with at least one of a pair of side surfaces opposite to each other as a light incident surface, from which light source light is guided, wherein:

at least one of both surfaces of the light guide plate in a thickness direction thereof is a light distribution control surface for adjusting light distribution characteristics of light emitted from the light guide plate, with formation of a plurality of flat surfaces, which extend in a direction perpendicular to the light incident surface and are arranged side by side in a longitudinal direction of the light incident surface on the light distribution control surface and formation of a plurality of prisms, which extend in the longitudinal direction of the light incident surface in areas other than the flat surfaces of the light distribution control surface, which are arranged in the direction perpendicular to the light incident surface, and each prism from among the plurality of prisms has a shape of triangle when viewed in the longitudinal direction of the light incident surface;

each of the plurality of flat surfaces is formed in such a way as to vary in width in the longitudinal direction of the light incident surface in the direction perpendicular to the light incident surface; and the plurality of the flat surfaces are formed so as to be reduced in width in a longitudinal direction of the light incident surface along with an increase in distance from the light incident surface.

16. A light guide plate for a surface light source with at least one of a pair of side surfaces opposite to each other as a light incident surface, from which light source light is guided, wherein:

at least one of both surfaces of the light guide plate in a thickness direction thereof is a light distribution control surface for adjusting light distribution characteristics of light emitted from the light guide plate, with formation of a plurality of flat surfaces, which extend in a direction perpendicular to the light incident surface and are arranged side by side in a longitudinal direction of the light incident surface on the light distribution control surface and formation of a plurality of prisms, which extend in the longitudinal direction of the light incident surface in areas other than the flat surfaces of the light distribution control surface, which are arranged in the direction perpendicular to the light incident surface, and each prism from among the plurality of prisms has a shape of triangle when viewed in the longitudinal direction of the light incident surface;

each of the plurality of flat surfaces is formed in such a way as to vary in width in the longitudinal direction of the light incident surface in the direction perpendicular to the light incident surface; and both of the pair of side surfaces are light incident surfaces and wherein the plurality of flat surfaces are each formed so as to have such a width in the longitudinal direction of the light incident surfaces that is minimum in an intermediate position between the pair of side surfaces in the direction perpendicular to the light incident surfaces and that increases along with a decrease in distance from each of the pair of side surfaces in the direction perpendicular to the light incident surface.

* * * * *